US009171412B2

(12) United States Patent
Frankenberger et al.

(10) Patent No.: US 9,171,412 B2
(45) Date of Patent: Oct. 27, 2015

(54) SENSOR AND METHOD FOR OPERATING THE SENSOR

(75) Inventors: Jorg Frankenberger, Markt Schwaben (DE); Michael Bloss, Munich (DE); Erich Kerst, Unterfohring (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 14/238,761

(22) PCT Filed: Aug. 13, 2012

(86) PCT No.: PCT/EP2012/003454

§ 371 (c)(1),
(2), (4) Date: Feb. 13, 2014

(87) PCT Pub. No.: WO2013/023776

PCT Pub. Date: Feb. 21, 2013

(65) Prior Publication Data

US 2014/0204365 A1 Jul. 24, 2014

(30) Foreign Application Priority Data

Aug. 17, 2011 (DE) ......................... 10 2011 110 894

(51) Int. Cl.
*G07F 7/04* (2006.01)
*G06K 7/00* (2006.01)

(Continued)

(52) U.S. Cl.
CPC .............. *G07D 7/128* (2013.01); *G07D 7/0006* (2013.01); *G07D 7/006* (2013.01); *G07D 7/0046* (2013.01);

(Continued)

(58) Field of Classification Search
CPC ..................... G06T 11/005; G06T 2201/0601; G07D 7/00; G07D 7/12; G07D 7/121; G07D 7/122; G07D 7/124; G07D 7/125; G07D 7/127; G07D 7/128; G07D 7/023; G07D 7/026; G07D 7/04; G07D 7/06; G07D 7/08; G07D 7/10; G07D 7/14; G07D 7/16; G07D 7/162; G07D 7/164; G07D 7/166; G07D 7/168; G07D 7/0006; G07D 7/002; G07D 7/0026; G07D 7/0033; G07D 7/004; G07D 7/0046; G07D 7/0053; G07D 7/006; G07D 7/0066; G07D 7/0073; G07D 7/008; G07D 7/0086; G07D 7/0093; G07D 2205/0012
USPC .................. 194/206, 207; 209/534; 382/135; 235/379; 700/21; 399/9–16, 18; 358/406, 504; 250/252.1, 339.09, 250/341.5, 363.09, 559.1; 356/228; 702/85, 702/91, 104, 106, 108, 113, 116–120
See application file for complete search history.

(56) References Cited

U.S. PATENT DOCUMENTS 4,587,434 A 5/1986 Roes et al.

(Continued)

FOREIGN PATENT DOCUMENTS

DE 39 39 789 A1 6/1991

(Continued)

OTHER PUBLICATIONS

German Search Report from German Application No. 10 2011 110 895.9, Nov. 30, 2011.

(Continued)

*Primary Examiner* — Jeffrey Shapiro
(74) *Attorney, Agent, or Firm* — Workman Nydegger

(57) ABSTRACT

A sensor for checking different features of value documents is arranged to carry out a self-test for testing its functionality. Before the sensor carries out its self-test, at least one of the features that is to be checked by the sensor is selected. It is provided in the self-test that the sensor rates a malfunction ascertained in the self-test differently and reacts to the ascertained malfunction differently in dependence on the selected feature. While a malfunction of the sensor has hitherto always led to a failure of the sensor, the sensor, despite ascertained malfunctions, can nevertheless carry out the check of certain features. It is achieved that the number of function failures of the sensor is reduced through the different reactions of the sensor to the ascertained malfunction in dependence on the feature.

15 Claims, 3 Drawing Sheets

(51) Int. Cl.

| | |
|---|---|
| ***G06K 9/00*** | (2006.01) |
| ***G07D 7/00*** | (2006.01) |
| ***G07D 7/12*** | (2006.01) |
| ***G07D 7/20*** | (2006.01) |
| ***G07D 11/00*** | (2006.01) |

(52) U.S. Cl.

CPC ................ *G07D 7/121* (2013.01); *G07D 7/122* (2013.01); *G07D 7/205* (2013.01); *G07D 7/2075* (2013.01); *G07D 11/0048* (2013.01)

(56) References Cited

U.S. PATENT DOCUMENTS

| | | | | |
|---|---|---|---|---|
| 5,184,305 | A | 2/1993 | Gronenberg | |
| 5,680,409 | A | 10/1997 | Qin et al. | |
| 5,790,693 | A | 8/1998 | Graves et al. | |
| 5,915,518 | A | 6/1999 | Hopwood et al. | |
| 6,356,857 | B1 | 3/2002 | Qin et al. | |
| 6,493,461 | B1 | 12/2002 | Mennie et al. | |
| 6,621,919 | B2 | 9/2003 | Mennie et al. | |
| 7,737,417 | B2 | 6/2010 | Giering et al. | |
| 8,304,713 | B2 | 11/2012 | Pradel | |
| 8,695,397 | B2 | 4/2014 | Sacquard et al. | |
| 2003/0118228 | A1 | 6/2003 | Mennie et al. | |
| 2005/0156116 | A1 * | 7/2005 | Schuett et al. | 250/372 |
| 2007/0032974 | A1 * | 2/2007 | Muniraju et al. | 702/85 |
| 2008/0135780 | A1 | 6/2008 | Giering et al. | |
| 2009/0022390 | A1 * | 1/2009 | Yacoubian et al. | 382/135 |
| 2011/0031386 | A1 | 2/2011 | Pradel | |
| 2011/0102772 | A1 | 5/2011 | Bloss et al. | |
| 2011/0174051 | A1 | 7/2011 | Sacquard et al. | |

FOREIGN PATENT DOCUMENTS

| | | | |
|---|---|---|---|
| DE | 199 02 939 | A1 | 3/2000 |
| DE | 101 51 854 | A1 | 5/2003 |
| DE | 698 13 040 | T2 | 10/2003 |
| DE | 102004035494 | A1 | 2/2006 |
| DE | 10 2007 038 753 | A1 | 2/2009 |
| DE | 10 2007 038 754 | A1 | 2/2009 |
| DE | 10 2008 028 690 | A1 | 12/2009 |
| DE | 102008048043 | A1 | 3/2010 |
| EP | 0 647 904 | A1 | 4/1995 |
| GB | 2 107 911 | A | 5/1983 |
| WO | 9519019 | A2 | 7/1995 |
| WO | 9948040 | A1 | 9/1999 |
| WO | 03/036572 | A2 | 5/2003 |
| WO | 2005/013206 | A1 | 2/2005 |

OTHER PUBLICATIONS

German Search Report From German Application No. 10 2011 110 894.0, Mar. 27, 2012.

International Search Report for Corresponding International PCT Application No. PCT/EP2012/003455, mailed Oct. 10, 2012.

International Search Report for corresponding International PCT Application No. PCT/EP2012/003454, mailed Oct. 10, 2012.

* cited by examiner

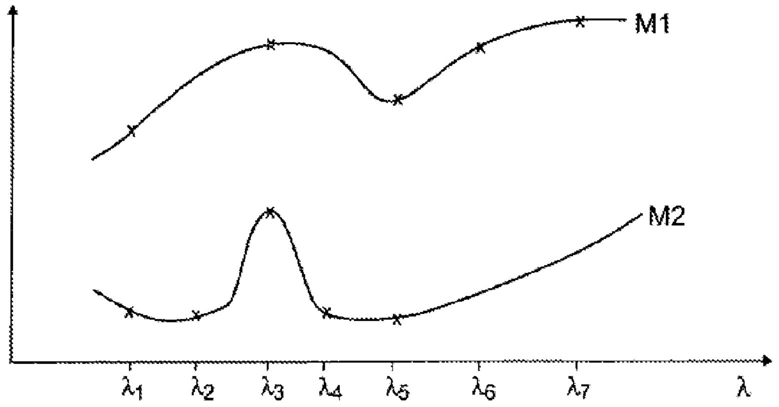

Fig. 2a

6

| | Feature M1 | Feature M2 |
|---|---|---|
| Provided operating mode | Operating mode B1:<br>Measuring tracks L1-L10<br>Wavelengths $\lambda_1$ - $\lambda_7$<br>Evaluation 1<br>Wavelengths $\lambda_1$ $\lambda_3$ $\lambda_5$ $\lambda_6$ $\lambda_7$<br>Measuring tracks L8-L10 | Operating mode B2:<br>Measuring tracks L1-L10<br>Wavelengths $\lambda_1$ - $\lambda_7$<br>Evaluation 2<br>Wavelengths $\lambda_1$ $\lambda_2$ $\lambda_3$ $\lambda_4$ $\lambda_5$<br>Measuring tracks L3-L10 |
| F1:<br>Malfunction $\lambda_3$ | Modified operating mode B1:<br>"Employ $\lambda_4$ instead of $\lambda_3$"<br>Evaluation 1<br>Wavelengths $\lambda_1$ $\lambda_4$ $\lambda_5$ $\lambda_6$ $\lambda_7$<br>Measuring tracks L8-L10 | Error message:<br>"Check of M2 not possible" |
| F2:<br>Malfunction $\lambda_5$ | Error message:<br>"Check of M1 not possible" | Modified operating mode B2:<br>"Check without $\lambda_5$"<br>Evaluation 2.1<br>Wavelengths $\lambda_1$ $\lambda_2$ $\lambda_3$ $\lambda_4$<br>Measuring tracks L3-L10 |
| F3:<br>Malfunction $\lambda_6$ | Modified operating mode B1:<br>"Interpolate measured value for $\lambda_6$"<br>Evaluation 1<br>Wavelengths $\lambda_1$ $\lambda_3$ $\lambda_5$ $\lambda_6^*$ $\lambda_7$<br>Measuring tracks L8-L10 | Check of M2 is not hindered thereby<br>Carry out check as provided! |
| F4:<br>Malfunction L5 | Check of M1 is not hindered thereby<br>"Carry out check as provided!" | Modified operating mode B2:<br>"Interpolate measured value for L5"<br>Evaluation 2<br>Wavelengths $\lambda_1$ $\lambda_2$ $\lambda_3$ $\lambda_4$ $\lambda_5$<br>Measuring tracks L3-L4, L5*, L6-L10 |

Fig. 2b

SENSOR AND METHOD FOR OPERATING THE SENSOR

BACKGROUND

This invention relates to a method for operating a sensor which is configured for checking value documents, and to a sensor which is configured for carrying out this method.

SUMMARY

For checking value documents it is usual to employ sensors with which the type of the value documents is determined and/or with which the value documents are checked for authenticity and/or for their state. Such sensors are employed e.g. for checking bank notes, checks, identity cards, credit cards, check cards, tickets, vouchers and the like. The value documents are usually checked in an apparatus for value-document processing which contains one or several sensors, depending on the value-document properties to be checked. For the check of the value documents, the latter are transported past the sensors along a transport path individually using a transport system.

For testing the function of a sensor which is arranged along the transport path of the value documents, a test medium is usually brought into the capture region of the sensor in order to detect a measured value of the test medium with the sensor. For this purpose, the value-document check is interrupted and—instead of a value document—the test medium is brought into the capture region of the sensor. This method is disadvantageous in that a test medium must be provided and its association with the sensor must be ensured. In the case of several sensors or upon replacement of the test medium, e.g. due to degradation of the test medium, confusion can easily arise, which can lead to false test results. Further, it has been proposed to install a test medium in the sensor itself, e.g. in the housing of the sensor. For testing the sensor function, the check of the value documents is interrupted and the test medium is swiveled into the capture region of the sensor in order to detect measured values thereof. It is disadvantageous here, too, that the check of the value documents must be interrupted for testing the sensor function.

In the functional check of a sensor it has hitherto been tested whether measured values that the sensor detects from the test medium brought into its capture region exceed predetermined minimum values. As long as the actual measured values lie above the minimum values, the sensor is functional. If an undershooting of a minimum value is ascertained, however, this results in a function failure of the sensor. Such function failures lead to interruptions of the operation of the sensor and of the appurtenant apparatus checking the value documents, thereby reducing the throughput of the value-document check. Function failures usually require an intensive testing of the sensor and/or involve manual interventions, e.g. by service staff, and thus increase the effort for operating the sensor.

An object of the present invention is hence to reduce the effort for operating a sensor configured for checking value documents.

This object is achieved by the subject matter of the independent claims. Claims dependent thereon state advantageous developments and embodiments of the invention.

The method according to the invention relates to a sensor which is configured for checking different features of value documents. The sensor can be a sensor for checking optical or magnetic or electrical or mechanical properties of the value documents, in order to check the value documents for their authenticity, their kind, their state or their quality. The method improves the operation of the sensor so as to reduce the number of function failures of the sensor. For ascertaining any malfunctions, the sensor carries out a self-test in which it tests its functionality autonomously. To enable the different features of the value documents to be checked, different operating modes are provided in the sensor. For this purpose, the sensor has e.g. a data memory in which there are respectively stored for each of the different features a provided operating mode or information on the respective operating mode employed by the sensor for checking the respective feature. Before the sensor carries out its self-test, at least one of the features is selected for the sensor to check. If no malfunction is ascertained in the self-test of the sensor, the sensor selects for checking the value documents the operating mode that is associated with the selected feature, and carries out a check of the value documents equipped with this feature in this operating mode.

If a malfunction is ascertained in the self-test, this can result in a function failure of the sensor, or the sensor can circumvent the malfunction and carry out the value-document check despite the malfunction. In the self-test of the sensor it is provided that the sensor rates a malfunction ascertained in the self-test differently in dependence on the selected feature and that the sensor reacts to the malfunction ascertained in the self-test differently in dependence on the selected feature. The sensor thus reacts to the same malfunction differently, depending on which of the features was selected. The sensor is configured e.g. for checking at least two different features and shows different reactions upon the same malfunction in dependence on which of the two features was selected. There can furthermore also be malfunctions for which it is determined that the sensor always reacts in the same way, independently of the selected feature. Upon ascertainment of a malfunction the sensor can store information about the ascertained malfunction in an error memory, in order for the information on the ascertained malfunction to be available later.

Through the different reactions of the sensor to the ascertained malfunction in dependence on the selected feature it is achieved that the number of function failures of the sensor is reduced. While a malfunction of the sensor has hitherto always led to a failure of the sensor, the sensor according to the invention, despite an ascertained malfunction, can nevertheless carry out the check of certain features, e.g. those whose check is not hindered by the malfunction. Even if the malfunction would hinder the check of a feature, the sensor only fails when there is no possibility for circumventing the malfunction. In many cases the sensor will be able to circumvent the malfunction, so that—instead of failing—it can continue being operated for checking the value documents.

In the case of an optical sensor, the sensor can rate the malfunction differently and react to the malfunction differently for example in dependence on the spectral properties of the selected feature, in particular in dependence on the spectral position and/or the spectral pattern of the feature.

The information on the different reactions that the sensor is to perform upon the ascertained malfunction, in dependence on the selected feature, is stored e.g. in the data memory of the sensor. From this information the sensor can derive or take the different reactions for the different features. For differently rating and reacting to the ascertained malfunction in dependence on the selected feature, the sensor employs those of the reactions stored in the data memory that are associated with the selected feature there. Advantageously, the sensor can hence perform its self-test fully autonomously and requires no data exchange with its environment therefor. Alternatively, the information on the different reactions can also be fed to the sensor from outside, e.g. through the above-mentioned apparatus.

In the self-test of the sensor it can be provided that the sensor rates a malfunction ascertained during its self-test differently in dependence on the selected kind of value document and that the sensor reacts to the malfunction ascertained during the self-test differently in dependence on the selected kind of value document. Kinds of value document are understood to be e.g. bank notes, checks, identity cards, credit cards, check cards, tickets, vouchers or a certain sort or version of the same. The kind of value document can also be a selection of several different sorts of value documents, e.g. value documents with certain features or value documents with certain dimensions. In the case of bank notes, the kind of value document can be the denomination, the currency, the emission or an indication of a selection of different denominations and/or currencies.

The feature to be checked can be selected for example by the sensor, before it carries out its self-test, being fed information about which of the features is to be checked. The sensor can receive this information e.g. via its communication interface, e.g. from the apparatus in which the sensor is operated, or from another sensor of this apparatus, or via a network or through an operator of the apparatus who selects the feature to be checked or the kind of value document to be checked, e.g. by a manual input on the sensor or on the apparatus. If several features are to be checked, the sensor is fed corresponding information on several features.

The feature to be checked can be selected by the sensor being fed information about the kind of value document to be checked. From the selected kind of value document the sensor can determine the feature(s) to be checked in this kind of value document, e.g. on the basis of an association between kind of value document and feature that is deposited in its data memory. The feature to be checked can also be selected by the sensor being informed which one(s) of several features of the same kind of value document is/are to be checked. The feature to be checked can also be selected by the sensor, before carrying out its self-test, establishing the kind of value document itself, e.g. after it has checked one or several of the value documents of the kind of value document to be checked. On the basis of the associations between kind of value document and feature which are deposited in the data memory of the sensor, the sensor can determine the feature to be checked in the respective kind of value document.

Preferably, the sensor carries out a predetermined self-test independently of the selected feature or the selected kind of value document. Advantageously, the sensor can then employ the same self-test for all features or kinds of value document. However, the sensor rates the results of the self-test differently and the sensor reacts differently in dependence on the selected feature or the selected kind of value document. The sensor is configured e.g. for carrying out only one self-test. Therein it is provided that the sensor rates an ascertained malfunction differently in dependence on the selected feature and reacts to the ascertained malfunction differently in dependence on the selected feature. Alternatively, the sensor can also be configured for carrying out different self-tests, e.g. different self-tests for the different features. Among the different self-tests one self-test is selected and carried out and the reaction to the same ascertained malfunction is different, e.g. in dependence on the selected feature.

In the self-test of the sensor it is provided that the sensor, if a feature was selected whose check would be hindered by the ascertained malfunction, reacts differently to the ascertained malfunction than if a feature was selected whose check would not be hindered by the ascertained malfunction. If the ascertained malfunction would not hinder the check of the selected feature, the sensor carries out the check of the selected feature in the operating mode provided for the selected feature. In this case no circumvention of the malfunction is necessary and the ascertained malfunction can be ignored upon the check of the feature.

For checking the selected feature a certain operating mode of the sensor is usually provided in which it is determined which measured values the sensor is to detect for checking the selected feature and how the detected measured values are to be evaluated for checking the feature. Preferably, it is provided in the self-test of the sensor that the sensor reacts to a malfunction that is ascertained during the self-test and would hinder the check of the selected feature, in certain cases, e.g. when the malfunction is circumventable, by the sensor automatically employing for checking the selected feature a modified operating mode, instead of the provided operating mode. And the sensor carries out the check of the selected feature or of the value documents in the modified operating mode. If the malfunction would hinder the check of the selected feature, the sensor can, where applicable, carry out one or several measures by which it counteracts the malfunction in order to restore its functionality for checking the selected feature, e.g. by readjusting measuring elements or by an adaptation of a supply voltage. It can also be provided that the sensor reacts to the same malfunction in certain other cases when the ascertained malfunction is not circumventable by the sensor outputting an error message indicating that the sensor is non-functional. The sensor can display the error message itself and/or send it via the communication interface to the apparatus in order to display the error message and/or process it further.

The modified operating mode can differ from the provided operating mode e.g. by the sensor omitting the measured value affected by the malfunction. For example, the affected measured value is detected but not taken into consideration in the evaluation of the measured values, and the evaluation is carried out only on the basis of the remaining measured values that are not affected by the malfunction. Alternatively, in the modified operating mode the measured value affected by the malfunction can also not be detected at all. In the case of an optical sensor, the modification can consist in the relevant light source in an illumination sequence being omitted or the relevant measured value not being detected or not taken into consideration in the evaluation. In the case of a sensor having several measuring tracks transverse to a transport direction of the value documents, the sensor can omit the measured value of the relevant measuring track or ignore it upon evaluation.

Preferably, at least one other measured value of the sensor is employed for checking the selected feature in the modified operating mode than is determined in the operating mode provided for checking the selected feature. The other measured value is e.g. a measured value that is derived, e.g. interpolated or extrapolated, from the detected measured values. The other measured value can also be a measured value that is not determined in the provided operating mode for checking the selected feature. To employ another measured value, there can be detected and evaluated e.g. an additional measured value that is not detected in the provided operating mode, or there can be evaluated an additional measured value that is detected but not evaluated in the provided operating mode.

The self-test is carried out in particular by a sensor already installed in an apparatus for checking value documents. The sensor carries out the self-test e.g. in the interim between the check of value documents to be successively checked. Additionally or alternatively, the sensor can also carry out the self-test before the onset of the value-document check, e.g. when the sensor or the apparatus is started up.

When the sensor is an optical sensor, the self-test comprises e.g. a test of the function of at least one light source of the sensor and/or of at least one photodetector of the sensor. For testing the function of the light source and/or of the photodetector, a portion of the light of the light source that is reflected on a window of the sensor is detected by the photodetector while no value document is present in the capture region of the sensor. Since this self-test requires no test medium and no value document, the self-test of the sensor is already possible before the onset of the value-document check. Moreover, this self-test can also test measuring tracks of the sensor that are located outside the value document to be checked. With the hitherto customary employment of a test medium, such edge measuring tracks cannot be tested, in contrast. For testing the function of the light sources, the portion of the light of the light source that is reflected on a window of the sensor is detected by that photodetector that also detects the light emanating from the value document for checking the value documents. Hence, no additional detector needs to be provided for the purpose of checking the light sources during the self-test. The self-test of the sensor by which the function of the light sources and/or of the photodetectors is tested can be carried out in the gap between two value documents transported successively past the sensor. In particular, the self-test can be carried out in each of these gaps or regularly after a certain time or number of value documents, or the self-test can be carried out before a change to another feature or to other value documents.

When the self-test of the sensor is carried out in this way, it comprises not only a test of the function of the light sources, but automatically also a test of the function of the photodetector. Using logical analyses it can be found out which of the light sources and/or of the photodetectors are affected by the malfunction. When e.g. the light of several light sources is detected successively with a certain photodetector, and the photodetector detects an insufficient signal upon the switch-on of each of these light sources, one can infer a malfunction of the photodetector or of the electronic circuit connected thereto. When the photodetector only detects an insufficient signal for one of these light sources, however, one infers a malfunction of this light source or its power supply or drive. A malfunction can already be ascertained on the basis of one insufficient measured value, or only through several measured values that indicate a malfunction. The sensor can additionally or alternatively also carry out different kinds of self-tests and identify malfunctions using other methods. Depending on which malfunction is ascertained and whether or not it is circumventable, the sensor might employ one of its modified operating modes for checking the value documents.

When the sensor is an optical sensor that detects the light emanating from the value documents at several wavelengths, there is employed in the modified operating mode for checking the selected feature e.g. at least one measured value that is detected at another wavelength than the measured values that are provided in the provided operating mode for checking the selected feature. In particular, there can be employed a measured value that the sensor detects upon illumination with another wavelength. In the case of spectrally different light sources, this can be obtained e.g. by a spectrally different illumination and, where applicable, an accordingly adapted evaluation. In the case of spectrally different photodetectors, a measured value can be detected and evaluated at another wavelength with identical illumination.

When the sensor is an optical sensor that detects the light emanating from the value documents at several wavelengths, there is employed in the modified operating mode for checking the selected feature e.g. at least one derived, e.g. interpolated or extrapolated, measured value, instead of the measured value affected by the malfunction. The employment of a derived measured value has the advantage that the evaluation can remain substantially the same—despite the modification of the operating mode—because the deriving step only needs to be added before the evaluation while the evaluation can otherwise remain the same. The interpolated measured value is interpolated e.g. from the detected measured values that are detected spectrally adjacent to the measured value affected by the malfunction. In the case of a malfunction of one of the light sources there is employed e.g., instead of the measured value that is detected upon illumination with the malfunctioning light source, an interpolated measured value that is interpolated from measured values that are detected upon illumination with light sources that are spectrally adjacent to the malfunctioning light source. In the case of spectrally resolved detection, the measured values of spectrally adjacent photodetectors are accordingly interpolated.

An optical sensor can employ for checking the selected feature in the modified operating mode, in the case of a malfunction of one of the light sources, one or several other light sources than is determined in the provided operating mode. The illumination can for this purpose be changed over to one or several other light sources. Instead of the light source affected by the malfunction there can be employed the spectrally identical wavelength, if present in the sensor. Otherwise there can also be employed one or several light sources of another wavelength that differs spectrally from the wavelength provided in the provided operating mode. Advantageously, this can avoid e.g. function failures of the sensor in the case of a spectrally broad-band feature for whose check spectrally adjacent light sources are also suitable.

If the sensor has several measuring tracks transverse to a transport direction of the value documents along which the value documents are transported past the sensor for their check, the sensor can rate the ascertained malfunction differently and react to the ascertained malfunction differently in dependence on the position of the selected feature on the value document. For example, the sensor can employ for checking the selected feature in the modified operating mode, in the case of a malfunction of one of the measuring tracks—a derived, e.g. interpolated, measured value instead of the measured value of the malfunctioning measuring track. The derived value can be interpolated from the measured values of the measuring tracks adjacent to the malfunctioning measuring track. Advantageously, the evaluation can remain substantially the same in this case, too, because only an interpolation step before the evaluation is necessary. The sensor can employ for checking the selected feature in the modified operating mode, in the case of a malfunction of one of the measuring tracks, instead of the measured value of the malfunctioning measuring track, the measured value of another measuring track that is adjacent to the malfunctioning measuring track. Thus, function failures of the sensor can be avoided upon the check of spatially extensive features.

The invention also relates to the sensor which is configured for checking different kinds of value documents and is configured, e.g. programmed, for carrying out the self-test according to the invention in which the sensor tests its functionality. In the data memory of the sensor there are respectively stored for each of the different features the operating mode or information on the provided operating mode employed by the sensor for checking the respective feature.

The data memory also stores one or several modified operating modes or information thereon, relating to the different reactions of the sensor. The data memory can be integrated in the housing of the sensor, or the data memory is a data memory present outside, e.g. data memory of the apparatus to which the sensor is connected. The sensor is moreover configured, e.g. programmed, such that, before the sensor carries out its self-test, at least one of the features that is to be checked by the sensor is selected, e.g. by the sensor itself, or that the sensor is fed corresponding information. In the self-test of the sensor it is provided that the sensor rates a malfunction ascertained during the self-test differently in dependence on the selected feature and that the sensor reacts to the malfunction ascertained during the self-test differently in dependence on the selected feature.

BRIEF DESCRIPTION OF THE DRAWINGS

Hereinafter the invention will be explained by way of example with reference to the following figures. There are shown.

DETAILED DESCRIPTION OF VARIOUS EMBODIMENTS

Figure 1A:
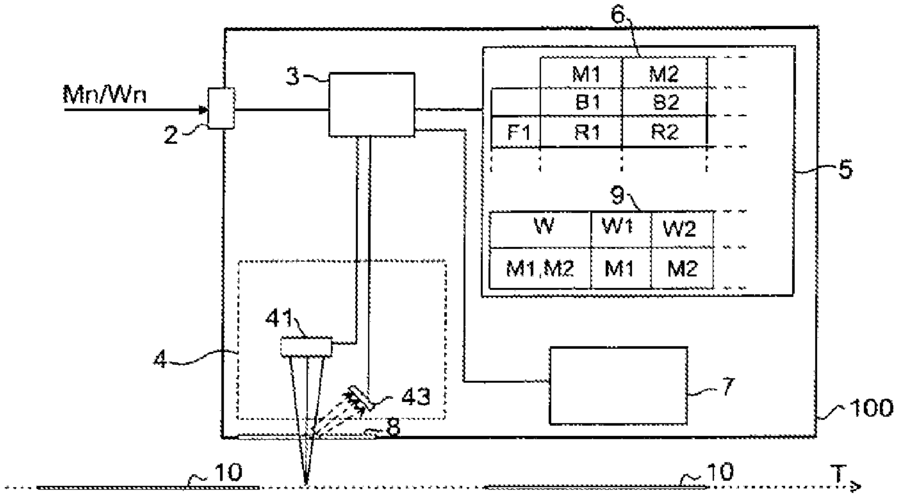
FIG. 1*a* a sensor for checking value documents which carries out a self-test, FIG. 1*b* a kind of value document W equipped with two features, and two kinds of value document W1, W2 which are respectively equipped with one feature, FIG. 2*a* spectral distribution of the light emanating from a feature of a value document, for two different features, FIG. 2*b* four malfunctions and appurtenant different reactions of the sensor, for two different features, FIG. 3 flowchart on the run of the self-test.

FIG. 1 shows a sensor which carries out a self-test according to the invention. As an example there was chosen an optical sensor 100 which has measuring elements 4, including one or several light sources 41 and one or several photodetectors 43, as well as, where applicable, further optical elements such as e.g. lenses, filters, etc. A value document 10 to be checked is checked while it is being transported past the sensor 100 along a transport direction T. For the check of the value document 10, the latter, when it is located in the capture region of the sensor, is illuminated by the light emitted by the light source(s) 41, and the light that is sent off by the value document as a result of the illumination is detected using the photodetector(s) 43. What is detected is e.g. the luminescent light or remitted light of the value document 10. The optical sensor 100 is configured in this example for detecting the light sent off by the value documents at several different wavelengths $\lambda_1$ to $\lambda_7$, cf. FIG. 2*a*. For this purpose, the detector has e.g. several light sources with different emission spectra or several photodetectors with spectrally different sensitivities, e.g. photodetectors equipped with different filters.

FIG. 2*a* shows for two features M1 and M2, e.g. authentication features of value documents, the respective spectral intensity distribution of the light that is sent off by a value document having the respective feature. FIG. 1*b* top shows a kind of value document W which is equipped with the two features M1, M2. FIG. 1*b* middle shows another kind of value document W1 which has only the feature M1, and FIG. 1*b* bottom shows a further other kind of value document W2 which is equipped only with the feature M2. Because the two features M1, M2 are present at different positions on the value document, different measuring tracks are relevant for the check of the two features M1 and M2.

The sensor 100 has a control device 3, e.g. a processor, which controls the measuring elements 4 for carrying out the self-test as well as for checking the features and evaluates the thereby detected measured values according to the respective operating mode. The control device 3 is connected to a data memory 5 of the sensor in which there is stored information on the different operating modes of the sensor 100 for several features Mn=M1, M2, . . . . These include e.g. the wavelengths and measuring tracks provided for the check of the respective feature Mn as well as information on the evaluation that is to be carried out for checking the respective feature.

In the data memory 5 there is contained for example the information on the operating modes from Table 6, cf. FIG. 2*b*, through which the features M1, M2 have associated therewith the operating modes B1, B2 that the sensor is to employ upon the check of the respective feature. The information on the respective operating mode comprises here the wavelengths and measuring tracks to be evaluated upon the check of the respective feature and the evaluation to be employed. In this example, measured values for the same wavelengths $\lambda_1$-$\lambda_7$ and measuring tracks L1-L10 are to be detected in both operating modes B1 and B2, but different evaluations carried out. In the operating mode for checking the feature M1, the wavelengths $\lambda_1$, $\lambda_3$, $\lambda_5$, $\lambda_6$ and $\lambda_7$ are provided for evaluation, and the measuring tracks L8 to L10. And in the operating mode for checking the feature M2, the wavelengths $\lambda_1$ to $\lambda_5$ are provided for evaluation and the measuring tracks L3 to L10. Further, Table 6 also contains information on the reactions R1, R2, . . . of the sensor to ascertained malfunctions. Furthermore, the data memory 5 can contain the information of Table 9 through which the sensor can establish from a selected kind of value document Wn the features Mn to be checked therein. Further, the data memory 5 can also store further information for checking the features, e.g. reference data of the respective feature with which the detected measured values are compared for checking the feature.

The sensor 100 further has a communication interface 2 via which it can receive and output information. To initiate the check of a certain feature, information can be fed to the sensor 100 before the value-document check via the communication interface 2 about which of the different features Mn or which of the kinds of value document Wn which the sensor can check is actually to be checked by the sensor. For example, it is fed to the sensor via the communication interface 2 that it is to check the feature M1. To inform the sensor of the feature to be checked, it suffices for the kinds of value document W1 and W2 to inform the sensor only of the kind of value document. For this purpose, e.g. only the information is fed to the sensor of which kind of value document Wn it is to check, e.g. that the kind of value document W1 is to be checked. Using the Table 9 deposited in the data memory 5 the sensor can unambiguously establish from this kind of value document W1 the feature M1 to be checked, and analogously M2 from W2.

Figure 1B:
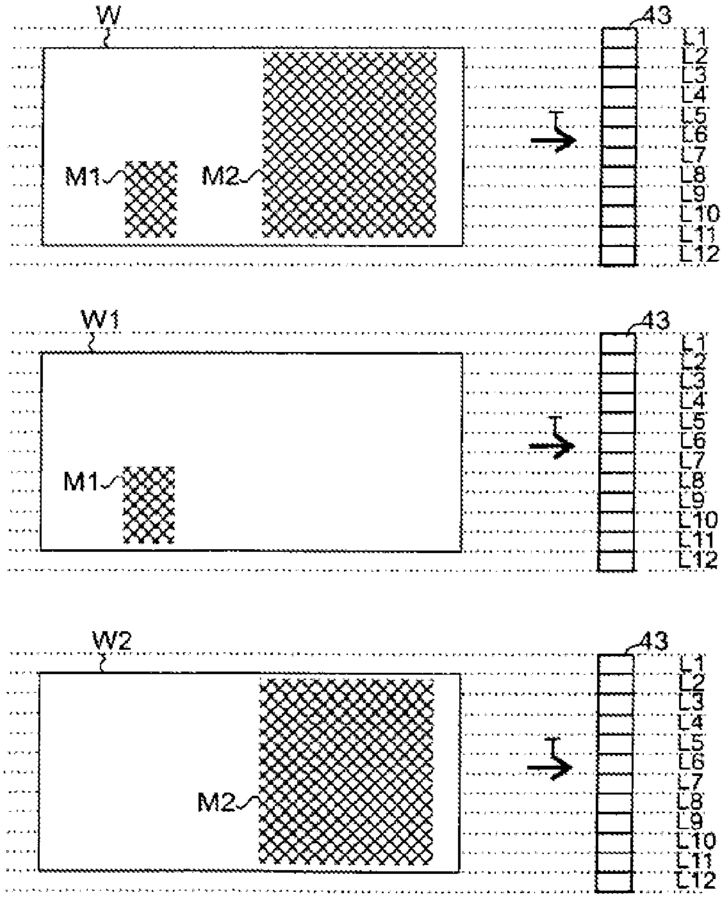

At the time represented in FIG. 1*a*, there is no value document 10 located in the capture region of the sensor 100. In this gap between the value documents 10, the function of the light sources 41 of the sensor is e.g. tested during the self-test. For this purpose, the light sources 41 are switched on individually one after the other in the gap between two value documents 10, and the light of the light sources partly reflected back on the window 8 of the sensor is respectively detected using the photodetector 43. On the basis of the light intensity detected from the individual light sources the sensor 100 ascertains whether or not a malfunction of the respective light source 41 is present. A malfunction of a light source is ascertained e.g. when the detected light intensity of the light source undershoots a certain minimum value. The function of the photodetectors 43 can also be tested analogously. The self-test can additionally or alternatively comprise a test of electronic components of the sensor, e.g. by checking an electrical voltage. The sensor can also employ the respective modified operating mode upon a malfunction of a component on whose function the light source or the photodetector depends.

Figure 3:
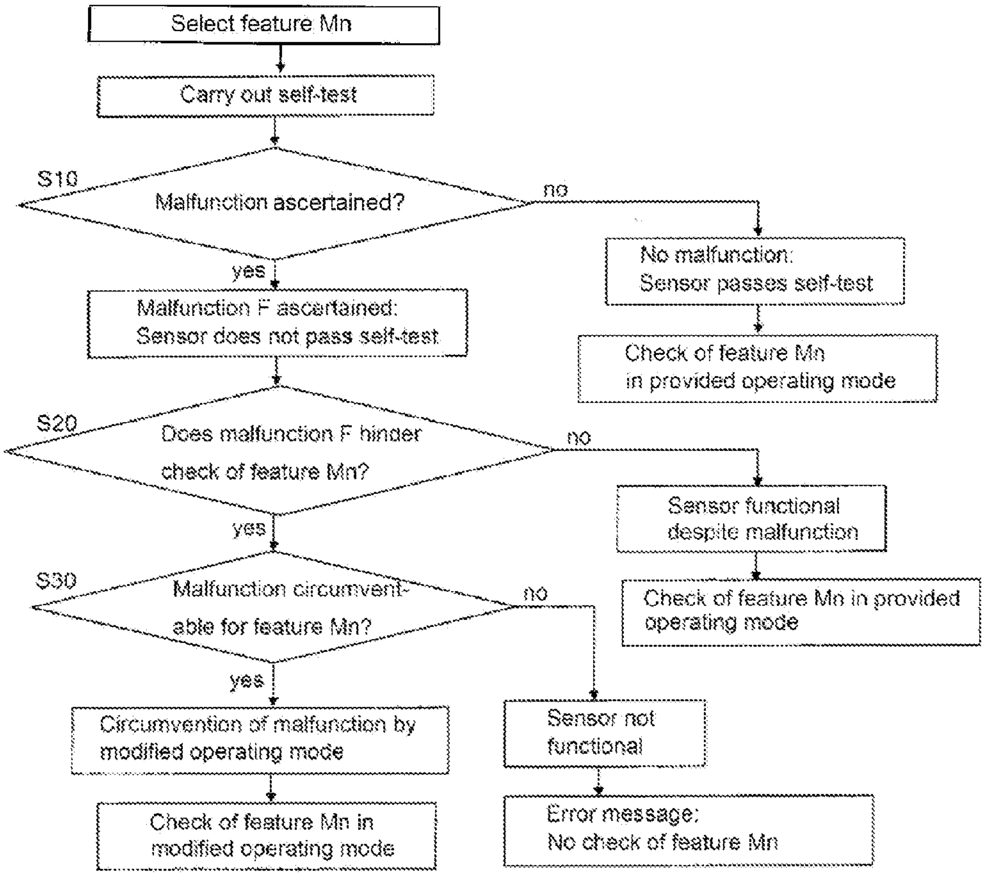

For carrying out the self-test of the sensor 100 one can proceed e.g. according to the flowchart represented in FIG. 3. Before the self-test is carried out the sensor is informed of the feature Mn to be checked or the kind of value document Wn to be checked via the communication interface 2. This can be effected before or during the value-document check. The sensor 100 then carries out the self-test before or during the value-document check, e.g. in the gap between two value documents. In the checking step S10 the sensor decides on the result of the self-test: If the sensor passes the self-test, the check of the selected feature Mn is carried out as provided on the relevant value documents having the feature Mn. If the sensor ascertains a malfunction F, however, the self-test is not passed. A non-passing of the self-test does not automatically lead to a non-functionality of the sensor, however. For the sensor checks whether or not the ascertained malfunction F is relevant for checking the selected feature Mn (checking step S20). Corresponding information is deposited in the data memory 5, cf. FIGS. 1*a* and 2*b*. If the malfunction F does not hinder the check of the feature Mn, the check of the selected feature is carried out as provided. However, a corresponding entry is written to the error memory 7 of the sensor. If the sensor ascertains in the checking step S20 that the ascertained malfunction F hinders the check of the selected feature Mn, the sensor distinguishes between the two cases of whether or not the malfunction F is circumventable for the selected feature Mn (checking step S30). For this purpose, the sensor 100 tests whether its data memory 5 contains for the selected feature Mn information about how to deal with the ascertained malfunction F in the case of the feature Mn, e.g. whether for the selected feature Mn information is contained for a modified operating mode for circumventing the ascertained malfunction F. If no modified operating mode is provided for the selected feature Mn for circumventing the malfunction F, the sensor ascertains that it is not operable for checking the feature Mn and emits a corresponding error message, e.g. via the communication interface 2 to the outside and writes a corresponding entry to the error memory 7. For example, the check of the value documents is thereupon stopped. Upon the check of different kinds of value document, the value documents in which this feature Mn is to be checked can also be rejected upon the check (reject stacking) while the other kinds of value document are checked as provided. However, if the sensor 100 finds in the Table 6 information on a modified operating mode through which the ascertained malfunction F is circumventable for the selected feature Mn, it chooses this modified operating mode. In this way the sensor circumvents the ascertained malfunction F, and the check of the selected feature Mn is carried out with the modified operating mode.

The data memory 5 of the sensor contains e.g. the information stated in Table 6 on the reactions of the sensor to a malfunction ascertained during the self-test, cf. FIG. 2*b*. On the basis of this information the sensor decides how to react to the ascertained malfunction for the respectively selected feature Mn. FIG. 2*b* specifies four examples of malfunctions F1-F4 and respective information on how the sensor is to rate one and the same malfunction differently in dependence on the feature M1 or M2 and respectively react differently thereto:

Malfunction F1:

In the self-test of the sensor a malfunction F1 of the light source $\lambda_3$ is ascertained. If the feature M1 was selected, the sensor ascertains on the basis of the information on the operating mode B1 that this malfunction F1 would hinder the functionality of the sensor. On the basis of the information of Table 6, however, the sensor ascertains that the malfunction F1 can be circumvented for the feature M1 by employing for checking the feature M1—instead of the measured value detected upon illumination with the malfunctioning light source $\lambda_3$—another measured value, namely the measured value detected upon illumination with the functional light source $\lambda_4$, cf. FIG. 2*a*. In the case of the feature M2, the sensor takes from Table 6 that the malfunction F1 is relevant for the check of this feature M2 and not circumventable. The sensor thereupon emits an error message that it is not functional for checking the feature M2 or the relevant value documents due to the malfunction F1 of the light source $\lambda_3$.

Malfunction F2:

In the self-test of the sensor a malfunction F2 of the light source $\lambda_5$ is ascertained. If the feature M1 was selected, the sensor ascertains on the basis of the information on the operating mode B1 that this malfunction F2 would hinder the functionality of the sensor. On the basis of the information of Table 6 the sensor further ascertains that the malfunction is not circumventable for this feature M1. The sensor thereupon emits an error message that it is not functional for checking the feature M1 or the relevant value documents due to the malfunction F2 of the light source $\lambda_5$. In the case of the feature M2, however, the malfunction F2 can be circumvented by not employing for checking the feature M2 the measured value detected upon illumination with the malfunctioning light source $\lambda_5$, as is provided in the operating mode B2, but rather the relevant measured value being dispensable, cf. FIG. 2*a*.

Malfunction F3:

In the self-test of the sensor a malfunction F3 of the light source $\lambda_6$ is ascertained. If the feature M1 was selected, the sensor ascertains on the basis of the information on the operating mode B1 that this malfunction F3 would hinder the functionality of the sensor. On the basis of the information of Table 6, however, the sensor ascertains that the malfunction is circumventable for this feature M1 by employing another measured value, namely by interpolating the measured values that are detected at $\lambda_5$ and $\lambda_7$. The measured value detected upon illumination with $\lambda_6$ is then, for the evaluation, replaced by the measured value $\lambda_6$* calculated by means of interpolation. In the case of the feature M2 the sensor takes from the information on the operating mode B2 that the check of the feature M2 is not hindered by the malfunction F3. The check of the feature M2 or of the relevant value documents can be carried out with the provided operating mode B2.

Malfunction F4:

In the self-test of the sensor a malfunction F4 of the measuring track L5 is ascertained, e.g. a malfunction of the photodetector of the measuring track L5. If the feature M1 was selected, the sensor ascertains on the basis of the information on the operating mode B1 that this malfunction F4 does not hinder the check of the feature M1. The check of the feature M1 or of the relevant value documents can be carried out with the provided operating mode B1. In the case of the feature M2 the sensor takes from Table 6 that the malfunction F4 would hinder the functionality of the sensor, but is circumventable for this feature M2 by employing another measured value, namely by interpolating the measured values that are detected in measuring track L4 and in measuring track L6. The measured value from measuring track L5 is then, for the evaluation, replaced by the measured value L5* calculated by means of interpolation.

During the self-test there are always tested for example, independently of the selected feature, all light sources or photodetectors of the sensor. However, the results of the self-test are rated differently in dependence on the kind of value document, cf. FIG. 2*b*. To accelerate the self-test, different self-tests can also be carried out in dependence on the selected feature. By the self-test there can be tested e.g. only those respective light sources or photodetectors that are provided for checking the respectively selected feature. If the feature M1 was selected, the self-test can be limited to the light sources of the wavelengths $\lambda_1$, $\lambda_3$, $\lambda_5$, $\lambda_6$ and $\lambda_7$ in the measuring tracks L8 to L10. And if the feature M2 was selected, the self-test can be limited to the light sources of the wavelengths $\lambda_1$ to $\lambda_5$ in the measuring tracks L3 to L10.

The invention claimed is:

1. A method for operating a sensor configured for checking different features of value documents and in which there is respectively provided for the different features an operating mode which the sensor employs for checking the respective feature, the sensor being configured for carrying out at least one self-test for testing its functionality, wherein the sensor carries out a self-test for testing its functionality; and before the sensor carries out the self-test, at least one of the features that is to be checked by the sensor is selected based on one or more associations between kind of value document and feature;

wherein it is provided in the at least one self-test of the sensor that the sensor rates a malfunction ascertained in the self-test differently in dependence on the selected feature and the sensor reacts to the malfunction ascertained in the self-test differently in dependence on the selected feature.

2. The method according to claim 1, wherein it is provided in the self-test of the sensor that the sensor, if a feature was selected whose check would be hindered by the ascertained malfunction, the reaction to the ascertained malfunction is different than if a feature was selected whose check would not be hindered by the ascertained malfunction.

3. The method according to claim 1, wherein it is provided in the self-test of the sensor that the sensor in certain cases reacts to a malfunction that is ascertained during the self-test and would hinder the check of the selected feature by the sensor employing for checking the value documents, instead of the provided operating mode, a modified operating mode.

4. The method according to claim 3, wherein the sensor, in the modified operating mode, checks the value documents exclusively on the basis of measured values that are not affected by the ascertained malfunction.

5. The method according to claim 3, wherein the sensor, in the modified operating mode, employs for checking the selected feature at least one other measured value than is determined in the operating mode provided for checking the selected feature.

6. The method according to claim 1, wherein the sensor is an optical sensor, and the sensor rates the ascertained malfunction differently and reacts to the ascertained malfunction differently in dependence on the spectral properties of the selected feature.

7. The method according to claim 1, wherein the sensor is an optical sensor, and the self-test comprises a testing of the function of at least one light source of the sensor and/or of at least one photodetector of the sensor while there is no value document present in the capture region of the sensor, wherein, for testing the function of the light source and/or of the photodetector, a portion of the light of the light source that is reflected on a window of the sensor is detected by the photodetector.

8. The method according to claim 7, wherein the self-test of the sensor by which the function of the light source and/or of the photodetector is tested is carried out in the gap between two value documents transported successively past the sensor.

9. The method according to claim 3, wherein the sensor is an optical sensor having several light sources which is able to detect the light emanating from the value documents at several wavelengths, and that the optical sensor employs for checking the selected feature in the modified operating mode, in the case of a malfunction affecting one of the light sources, at least one other light source than is determined in the provided operating mode.

10. The method according to claim 3, wherein the sensor is an optical sensor which can detect the light emanating from the value documents at several wavelengths, and that the optical sensor employs for checking the selected feature in the modified operating mode at least one measured value that is detected at another wavelength than the measured values that are determined in the provided operating mode for checking the selected feature.

11. The method according to claim 3, wherein the sensor is an optical sensor which can detect the light emanating from the value documents at several wavelengths, and that the optical sensor employs for checking the selected feature in the modified operating mode, instead of a measured value affected by the malfunction, a derived measured value which is derived from measured values that are detected spectrally adjacent to the measured value affected by the malfunction.

12. The method according to claim 1, wherein the sensor has several measuring tracks transverse to a transport direction of the value documents along which the value documents are transported past the sensor for their check, and that the sensor rates the ascertained malfunction differently, in dependence on the position of the selected feature on the value document, and reacts to the ascertained malfunction differently, in dependence on the position of the selected feature on the value document.

13. The method according to claim 3, wherein the sensor employs for checking the selected feature in the modified operating mode, in the case of a malfunction of one of the measuring tracks, instead of the measured value of the measuring track affected by the malfunction, a derived measured value which is derived from the measured values of measuring tracks that are adjacent to the measuring track affected by the malfunction.

14. The method according to claim 3, wherein the sensor employs for checking the selected feature in the modified operating mode, in the case of a malfunction of one of the measuring tracks, instead of the measured value of the measuring track affected by the malfunction, the measured value of another measuring track that is adjacent to the measuring track affected by the malfunction.

15. A sensor for checking different features of value documents which is configured for carrying out at least one self-test in which the sensor can test its functionality, in particular a self-test according to claim 1, with an operating mode being respectively provided in the sensor for checking the different features, wherein the sensor is configured such that, before the sensor carries out a self-test, at least one of the features that is to be checked by the sensor is selected, and it is provided in the self-test of the sensor that the sensor rates a malfunction ascertained during the self-test differently in dependence on the selected feature and the sensor reacts to the malfunction ascertained during the self-test differently in dependence on the selected feature.

* * * * *